(12) United States Patent
Onoda

(10) Patent No.: US 7,843,438 B2
(45) Date of Patent: Nov. 30, 2010

(54) NOTEBOOK-SIZED COMPUTER AND INPUT SYSTEM OF NOTEBOOK-SIZED COMPUTER

(75) Inventor: Naoto Onoda, Koto-ku (JP)

(73) Assignee: Wacom Co., Ltd., Saitama-ken (JP)

( * ) Notice: Subject to any disclaimer, the term of this patent is extended or adjusted under 35 U.S.C. 154(b) by 863 days.

(21) Appl. No.: 11/434,508

(22) Filed: May 16, 2006

(65) Prior Publication Data

US 2006/0267961 A1 Nov. 30, 2006

(30) Foreign Application Priority Data

May 16, 2005 (JP) .............................. 2005-142579

(51) Int. Cl.
*G09G 5/00* (2006.01)
*G06F 3/041* (2006.01)
(52) U.S. Cl. ........................ 345/173; 345/156; 345/169
(58) Field of Classification Search .......... 345/156–181
See application file for complete search history.

(56) References Cited

U.S. PATENT DOCUMENTS 7,474,300 B2 * 1/2009 Katsurahira et al. ......... 345/179
2003/0122790 A1 * 7/2003 Sharma ....................... 345/173
2003/0142065 A1 * 7/2003 Pahlavan ..................... 345/156
2006/0044259 A1 * 3/2006 Hotelling et al. ............ 345/156

\* cited by examiner

*Primary Examiner*—Duc Q Dinh
(74) *Attorney, Agent, or Firm*—Berenato & White, LLC

(57) ABSTRACT

A notebook-sized computer, comprising a main unit having a display screen portion with a display screen and a key input portion, said notebook-sized computer further comprising an electrostatic capacitance type input pad by which the touch operation by user's finger is detectable, a palm rest portion arranged near the electrostatic capacitive type input pad underneath which the sensor substrate of a position detection device is placed, and a position detection device comprising the sensor substrate mounted internally in said notebook-sized computer and including a plurality of loop coil groups realized by one or a plurality of patterns on the sensor substrate, each of the loop coils comprising at least one turn, a position detection circuit electrically connected to the loop coils within the sensor substrate, a position indicator having a resonance circuit coupled to said coils in electromagnetic coupling fashion, wherein the detection circuit detects operations initiated by using the position indicator when the position indicator is placed in contact with or suspended a prescribed distance above the sensor substrate.

21 Claims, 6 Drawing Sheets

(a)

(b)

(a)

(b)

(a)

(b)

NOTEBOOK-SIZED COMPUTER AND INPUT SYSTEM OF NOTEBOOK-SIZED COMPUTER

CROSS-REFERENCE TO RELATED APPLICATIONS AND CLAIM TO PRIORITY

The present invention contains subject matter related to Japanese Patent Application JP 2005-142579, filed in the Japanese Patent Office on May 16, 2005, the entire contents of which are incorporated herein by reference and to which priority is claimed.

FIELD OF THE INVENTION

This invention relates to a notebook-sized computer having a display screen, and to an input system for a notebook-sized computer.

BACKGROUND OF THE INVENTION

Normally, notebook-sized computers have, in addition to a keyboard as a key input device, a touchpad or other position input device, also called a pointing device such as shown in Japanese Patent Laid-open No. 2000-200146 (FIG. 31)

SUMMARY OF THE INVENTION

The position input devices in notebook-sized computers of the prior art are required to be lightweight and compact, and there remains room for improvement in operability. For these reasons, users desiring devices with improved operability have connected notebook-sized computers to a mouse or other external device for use; in such cases, however, the notebook-sized computer cannot easily be moved, and there is the further drawback that space must be secured in which to place the pointing device.

The disclosed invention was devised in light of the above-described circumstances, and has as an object the ability to use a position input device with excellent operability in a notebook-sized computer, without detracting from portability or ease of placement.

In order to resolve the above problems, a notebook-sized computer of the invention, comprising a main unit having a display screen portion with a display screen and a key input portion, is characterized in the provision of a position detection device, in which a virtual operation area based on a position indicator is set on the upper surface of the main unit, extending forward from the key input portion, and the position of the position indicator in the operation area is detected by means of electromagnetic coupling with the position indicator comprising at least one coil.

Here, the position indicator comprises a pressure operation portion which is pressed and operated, and a pressure response mechanism, in which the inductance of the coil is changed upon application of a depressing force to the pressure operation portion; this position detection device may also be configured such that, by detecting the change in inductance of a coil of the position indicator, pressure operation in the pressure portion is detected.

The position detection device may be configured to comprise a sensor substrate, placed in a position corresponding to the operation area, and a detection circuit portion, which detects the position of the position indicator on the sensor substrate.

A configuration may be employed in which a shield plate of a magnetic material is placed on the rear-surface side of the sensor substrate.

A configuration may be employed in which the sensor substrate is affixed to the rear surface of the panel constituting the front surface of the main unit.

A configuration may be employed in which a depression is formed in the upper surface of the main unit, in a range comprising the operation area, and in which the sensor substrate is placed at the bottom of the depression.

Here, a configuration may be employed in which the depression is formed by providing a hole in the panel constituting the upper surface of the main unit, and the sensor substrate is placed so as to fill the hole.

A configuration may be employed in which an operation area display member indicating the operation area is provided on the upper surface of the main unit.

Further, a configuration may be employed in which a relative position input device to input relative position coordinates is placed on the upper surface of the main unit extending in the forward direction from the key input portion, and in which the operation area is positioned on one side of the relative position input device.

An input system of this invention, to perform input operations using a position indicator comprising at least one coil in a notebook-sized computer comprising a main unit having a key input portion, is characterized in that a virtual operation area based on a position indicator is set on the upper surface of the main unit, extending forward from the key input portion, and the position of the position indicator in the operation area is detected by means of the electromagnetic coupling with the position indicator.

Here, in the position indicator the coil may be incorporated in a pen-type housing.

Further, the position indicator may comprise a circuit accommodation portion which accommodates the coil, and a support portion which supports the circuit accommodation portion, and has a shape which maintains contact with the side of the user's finger, while maintaining a state in which the tip of the finger is exposed.

According to this invention, in a notebook-sized computer comprising a main unit having a key input portion, position input operation using a position indicator is possible in an operation area positioned in front of the key input portion. By this means, position input using the position indicator can be performed while performing key input operations in the key input portion. There is no need for external connection of any device to the notebook-sized computer, so that the portability and ease of placement of the notebook-sized computer are not compromised. Further, the position detection device provided in the notebook-sized computer utilizes electromagnetic coupling to detect the position of the position indicator, and so position input is possible with high precision, and a light touch in operation can be realized.

DESCRIPTION OF THE PREFERRED EMBODIMENT(S)

Figure 1:
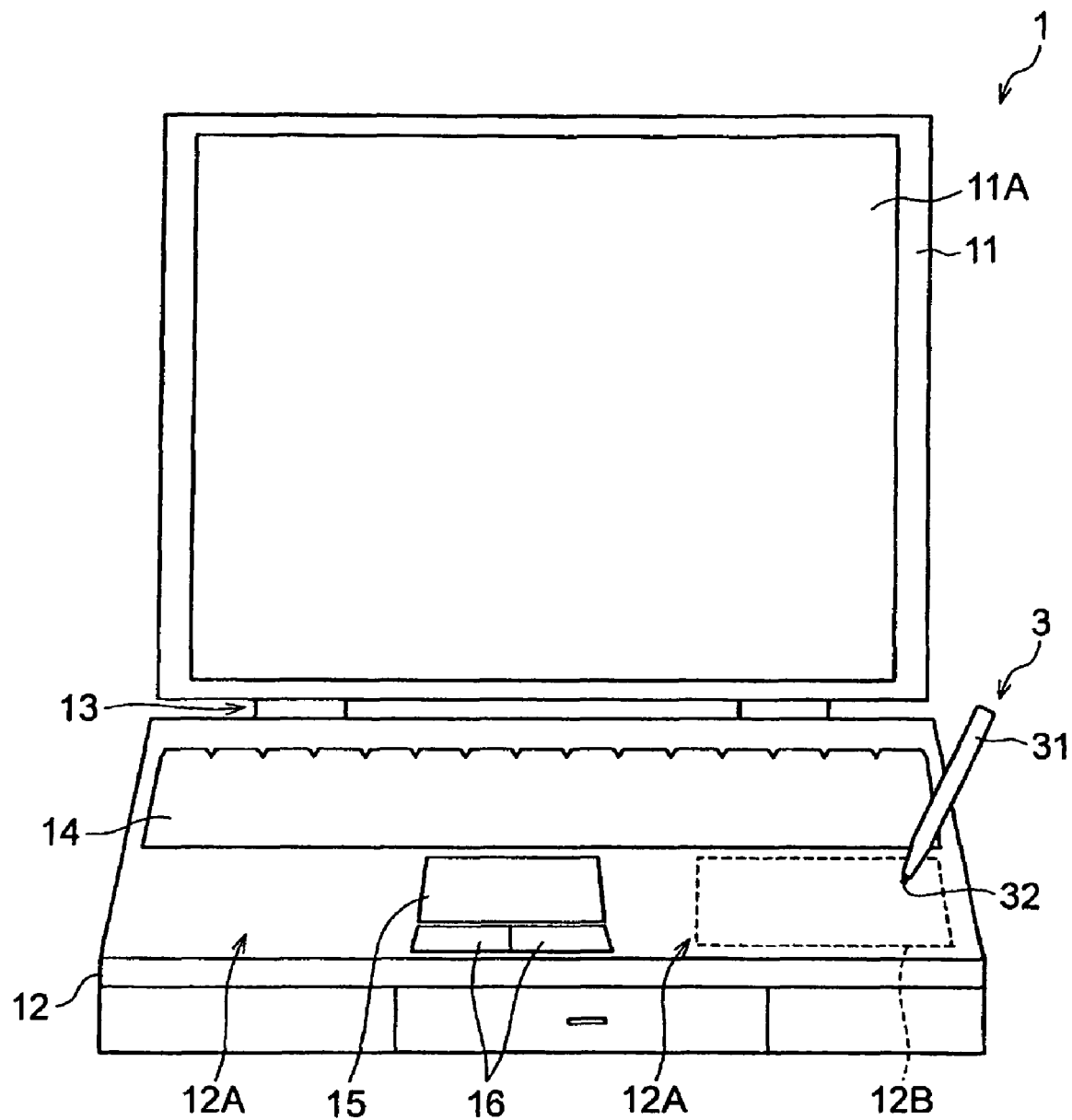
FIG. 1 is a perspective view showing the configuration of the notebook-sized computer according to the invention.

Below, aspects of the invention are explained, referring to the drawings.

FIG. 1 is an external view showing a configuration of the notebook-sized computer according to a first embodiment to which this invention is applied. As shown in FIG. 1, the housing 10 of the notebook-sized computer 1 is configured with a display screen portion 11 and a lower main unit 12 as a main unit. The display screen portion 11 and lower main unit 12 are connected by a hinge portion 13 in a manner enabling folding the display 11 toward and away from the lower main unit 12.

A liquid crystal display 11A is positioned in the display screen portion 11. Various images are displayed on the liquid crystal display screen 11A, under the control of a CPU (Central Processing Unit), not shown, mounted on the computer main board 18 (FIG. 3), described below.

In the lower main unit 12 are positioned, as input devices for the user to perform input operations, a keyboard 14 as a key input portion, an input pad 15, and an input switch 16.

The keyboard 14 is embedded in the upper surface of the lower main unit 12. The keyboard 14 is a key input device provided with number keys, character keys, various symbol keys, and keys to which are assigned specific functions. The keyboard 14 outputs operation signals corresponding to the keys that are pressed and operated by the user. The upper end of each key provided on the keyboard 14 either protrudes slightly from the upper surface of the lower main portion 12, or else is in the same plane as the upper surface of the lower main unit 12.

The input pad 15, which is a relative position input device, is embedded in the upper surface of the lower main unit 12 and extends further forward (in the direction moving away from the hinge portion 13) from the keyboard 14. The input pad 15 is a position input device which detects operations by a finger of the user by, for example, detecting changes in electrostatic capacitance and the depressing force. The input pad 15 is covered by a substantially rectangular or circular operation plate, slightly depressed from the upper surface of the lower main unit 12. The position at which a finger of the user makes contact on the operation plate is detected, and operation signals are output according to movement of this contact position. The operation signals output by the input pad 15 are, for example, signals indicating the relative position coordinate according to the direction of motion and movement amount of the contact position of the user's finger.

The input switch 16 is a switch operated in combination with the input pad 15, and is positioned in the vicinity of the input pad 15 (in the example shown in FIG. 1, on the front side of the input pad 15). The input switch 16 is a depression switch, or switches, which outputs an operation signal upon being pressed down, and protrudes slightly above the upper surface of the lower main unit 12, or has a planar-shaped operation surface, configured so as to be in the same plane as the upper surface of the lower main unit 12. As shown in FIG. 1, a plurality of such switches 16 may be provided.

Figure 3:
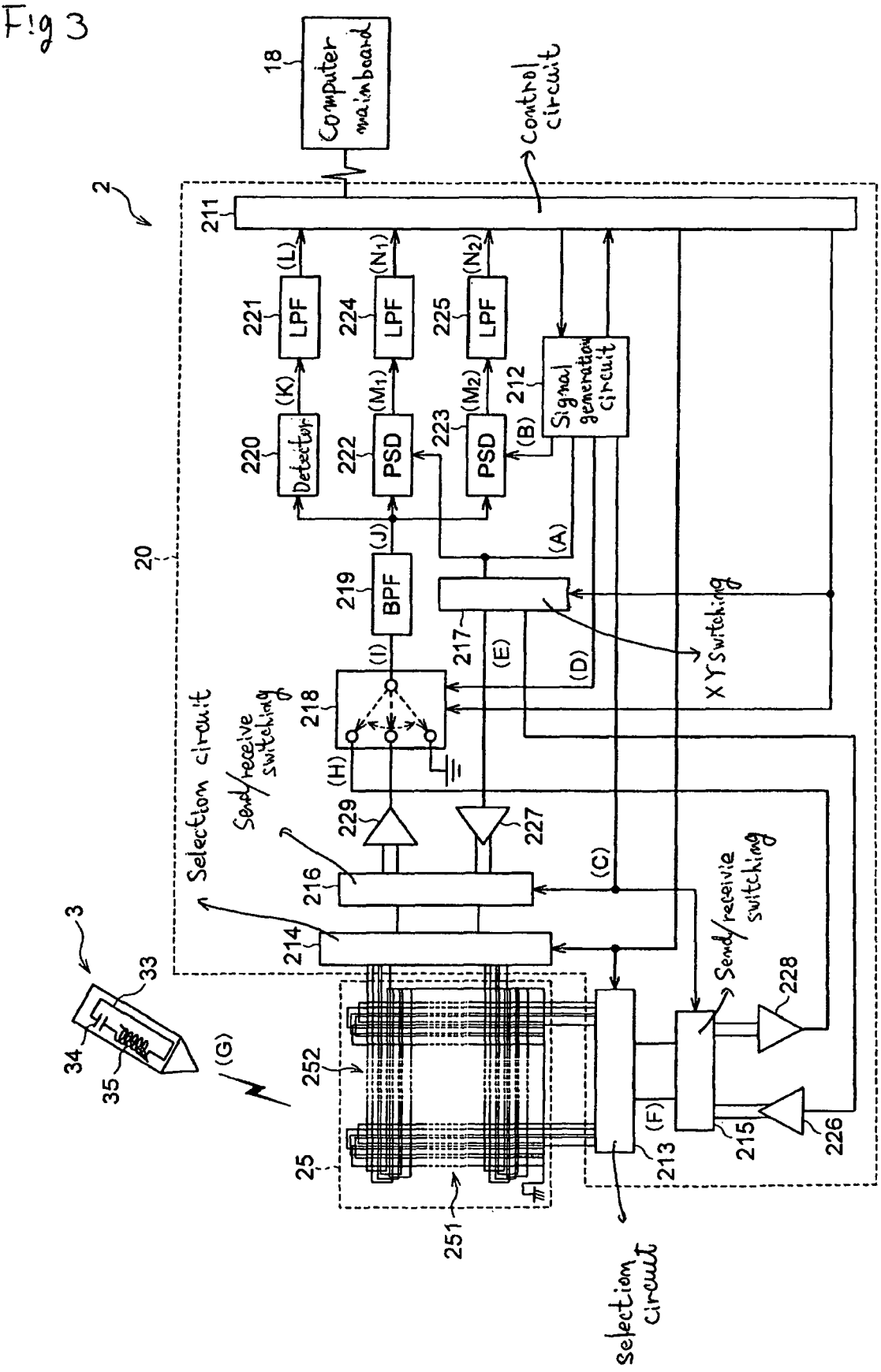
FIG. 3 is a circuit diagram showing in detail the configuration of the position detection portion.

The notebook-sized computer 1 incorporates a computer main board 18, as best shown in FIG. 3. On this computer main board 18 are mounted or connected various devices, such as a CPU (Central Processing Unit), ROM (Read-Only Memory), RAM (Random Access Memory), HDD (Hard Disk Drive), not shown, and other components typically found with a computer. The above-described input devices, which are the keyboard 14, input pad 15 and input switch 16, are connected to the computer main board 18. Operation signals output from these input devices are input to the CPU.

The notebook-sized computer 1 can realize various functions by reading programs and data stored in advance into RAM according to input operations using the keyboard 14, input pad 15 and input switch 16, and executing programs using the CPU. The notebook-sized computer 1 displays the contents of input using the keyboard 14, input pad 15 and input switch 16, as well as the execution results of program execution by the CPU and similar, on the LCD display screen 11A under the control of the CPU.

In the lower main unit 12 of the notebook-sized computer 1, on the right and left sides of the input pad 15 on the upper surface of the housing 10, there exist spaces in which nothing is ordinarily positioned. These spaces may serve as palm rest portions 12A. Palm rest portions 12A are bases on which the user places his or her palms during operation of the keyboard 14, and have the advantage of alleviating the burden on the arms of the user.

The input pen 3 is a position indicator comprising a case 31, which mimics the shape of a stylus, and a core 32 protruding from the tip of the case 31, and is held like a stylus in the hand when used.

The method of operation using the input pen 3 is as follows. First, if the input pen 3 is positioned within a prescribed distance from the upper surface of the lower main unit 12, the position of the core 32 in the effective area is detected. Hence simply by moving the input pen 3 to an arbitrary position, the user can input a position. In the position input operation, the position is detected whether the core 32 is in contact with the upper surface of the lower main unit 12, or is not in contact with the upper surface, such as when the input pen 3 is suspended above the surface.

Further, when the core 32 of the input pen 3 is pressed against the housing 10 to perform an operation (pressure operation) in the effective area 12B, the depressing force applied to the core 32 is detected.

Figure 2:
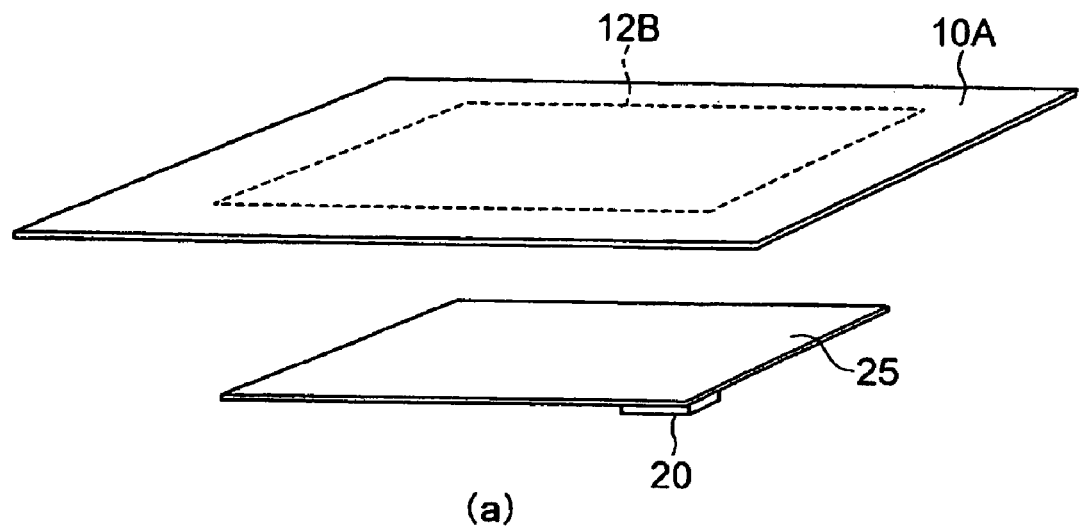
FIG. 2A is an exploded oblique view of the lower main unit of the invention and FIG. 2B is a cross-sectional view thereof.
Figure 2:
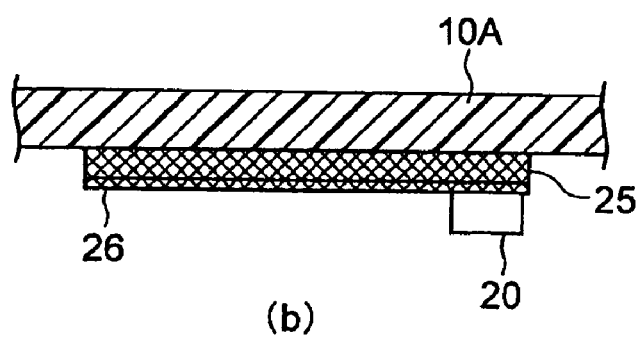

FIG. 2 shows the principal portions of the lower main unit 12, showing the effective area 12B and vicinity thereof. FIG. 2A is an exploded oblique view and FIG. 2B is a cross-sectional view.

As shown in FIG. 2A and FIG. 2B, the sensor substrate 25 is positioned on the lower (rear) side of the housing panel 10A constituting the surface of the lower main unit 12, below the effective area 12B. As described below referring to FIG. 3, the sensor substrate 25 is a substrate having loop coils to detect the position of the input pen 3 and pressure operations.

It is preferable that the sensor substrate 25 be placed parallel to the surface of the housing panel 10, and that the sensor substrate 25 and housing panel 10A be in proximity. Hence as a suitable method for fixing the sensor substrate 25 in place, for example, a method of using an adhesive material, double-sided tape or similar to affix the sensor substrate 25 to the rear surface of the housing panel 10A may be used. These methods have the advantage of being extremely simple and enabling reliable installation of the sensor substrate 25.

On the rear-surface side of the sensor substrate 25 is placed a shield plate 26. The shield plate 26 is a sheet (or plate) member which covers substantially the entire rear surface of the sensor substrate 25, and covers at least the area in which the loop coils are located, as described below. The shield plate 26 is formed from a metal or other magnetic material, and, by alleviating or eliminating the effect of noise from various equipment existing on the periphery of the sensor substrate 25, has the effect of raising the detection sensitivity of the sensor substrate 25.

Further, a detection circuit portion 20 is positioned within the lower main unit 12. The detection circuit portion 20 is electrically connected to loop coils within the sensor substrate 25 by a flexible cable or other means, not shown, and detects the position of the input pen on the sensor substrate 25 and detects operations initiated by using the input pen 3. The detection circuit portion 20 can be appropriately positioned according to the positions of various devices incorporated within the notebook-sized computer 1 and according to the effects of heat generation. As shown in FIG. 2A and FIG. 2B, the detection circuit portion 20 can be positioned below the shield plate 26, or can be positioned at a distance from the sensor substrate 25.

In the notebook-sized computer 1, operations using the above-described input pen 3 are detected by the position detection portion 2 (position detection device) comprising the sensor substrate 25 and the detection circuit portion 20.

FIG. 3 is a circuit diagram showing in some detail the configuration of the position detection portion 20. To facilitate understanding, the circuit incorporated in the input pen 3 and the computer main board 18 are also shown in FIG. 3.

The input pen 3 incorporates within the above-described case 31, as best shown in FIG. 1, a resonance circuit 33, comprising a capacitor 34 and coil 35. Wireless signals at a prescribed frequency are transmitted between the resonance circuit 33 and the loop coil groups 251, 252 of the sensor group 25. The input pen 3 also comprises, as a pressure operation portion, a pressure-response mechanism in which the inductance of the coil 35 changes according to the depressing force applied to the core 32. By this means, when a depressing force is applied to the core 32 during operations with the input pen 3, the resonance frequency of the resonance circuit 33 changes.

A virtual X-Y orthogonal coordinate system, comprising an X axis and Y axis in directions equivalent to the horizontal direction and the vertical direction, are set on the sensor substrate 25. The loop coil groups 251, 252 are positioned in correspondence with this X-Y orthogonal coordinate system.

The loop coil group 251 comprises a plurality of (for example, 48) loop coils 251-$i$ ($i$=1, 2, ..., 48) arranged in the X-axis direction. The loop coils 251-$i$ are single-turn loop coils extending along the Y-axis, are parallel, and are positioned so as to overlap. Further, the loop coil group 252 comprises a plurality of (for example, 48) loop coils 252-$i$ ($i$=1, 2, ..., 48) arranged in the Y-axis direction. The loop coils 252-$i$ are single-turn coils extending in the X-axis direction, are parallel, and are positioned so as to overlap.

These loop coil groups 251, 252 are realized by one or a plurality of printed patterns on the sensor substrate 25. Each of the loop coils 251-$i$, 252-$i$ is not limited to a single turn, but may comprise a plurality of turns as necessary.

The loop coil groups 251, 252 are placed in an area overlapping the effective area 12B on the housing panel 10A, so as to enable detection of the position of and operations by the input pen 3 in the effective area 12B.

The detection circuit portion 20 comprises a control circuit 211, signal generation circuit 212, selection circuit 213, selection circuit 214, send/receive switching circuits 215 and 216, XY switching circuit 217, receive timing switching circuit 218, band-pass filter (BPF) 219, detector 220, low-pass filter (LPF) 221, phase shift detectors (PSD) 222, 223, low-pass filters (LPFs) 224, 225, driving circuits 226, 227, and amplifiers 228, 229. This detection circuit portion 20 is connected to the computer main board 18 incorporated into the notebook-sized computer 1 (FIG. 1).

The detection circuit portion 20 repeatedly executes transmission actions and reception actions at prescribed intervals, in order to detect operations initiated through use of the input pen 3. In a transmission action, electric waves are transmitted from the loop coil groups 251, 252 of the sensor substrate 25 to the resonance circuit 33, and, by means of these electric waves, a current is induced in the resonance circuit 33. In the resonance circuit 33, electric waves are generated by the coil 35 based on the induced current. These electric waves are received by the loop coil groups 251 and 252 during the reception action, and, based on these electric waves, the position of the input pen 3, whether a depressing operation on the core 32 has been performed, and the depressing pressure (stylus pressure) applied to the core 32, are detected.

The control circuit 211 controls the signal generation circuit 212, and controls switching between the loop coils of the loop coil groups 251, 252 by the selection circuits 213, 214. The control circuit 211 controls the XY switching circuit 217 and the receive timing switching circuit 218 to cause switching of the coordinate detection direction (X direction, Y direction) The control circuit 211 also performs analog/digital (A/D) conversion of the output from the low-pass filters 221, 224, 225, executes prescribed processing, and determines the coordinate values of the position indicated by the input pen, as well as detecting the phase of the received signals, and transmits these data to the computer main board 18.

The selection circuit 213 selects one loop coil 251-$i$ from among the X-direction loop coil group 251 according to control by the control circuit 211. The selection circuit 213 also selects one loop coil 252-$i$ from among the Y-direction loop coil group 252 under the control of the control circuit 211.

The send/receive switching circuit 215 alternates connection of the loop coil 251-$i$ selected by the selection circuit 213 according to the send/receive switching signal C input from the signal generation circuit 212, between the driving circuit 226 and the amplifier 228. The send/receive switching circuit 216 alternates connection of the loop coil 252-$i$ selected by the selection circuit 213 according to the send/receive switching signal C, between the driving circuit 227 and the amplifier 229.

The signal generation circuit 212 generates and outputs a square-wave signal A at a prescribed frequency f0, a signal B the phase of which lags the square-wave signal A by 90°, a send/receive switching signal C at a prescribed frequency fk, and a receive timing signal D. The square-wave signal A output from the signal generation circuit 212 is sent to the phase detector 222, and is converted into a sine-wave signal E by a low-pass filter (not shown), before being sent via the XY switching circuit 217 to one of the driving circuits 226, 227. The square-wave signal B output from the signal generation circuit 212 is sent to the phase detector 223, the send/receive switching signal C is sent to the send/receive switching circuits 215 and 216, and the receive timing signal D is sent to the receive timing switching circuit 218.

Information to select the X direction is output from the control circuit 211, and in the state of being input to the XY switching circuit 217 and the receive timing switching circuit 218, the sine-wave signal E output from the signal generation circuit 212 is sent to the driving circuit 226 and converted into a balanced signal, which is further sent to the send/receive switching circuit 215. Here, the send/receive switching circuit 215 switches and connects either the driving circuit 226 or the amplifier 228, based on the send/receive switching signal C; hence the signal output from the send/receive switching circuit 215 to the selection circuit 213 is a signal F that is repeatedly output and stopped at each time T (=½fk). The signal F output from the send/receive switching circuit 215 passes through the selection circuit 213 and is output to the loop coil 251-*i* selected from the loop coil group 251, and electric waves are generated by the signal F in this loop coil 251-*i*.

While the signal F is being output, the detection circuit portion 20 executes the transmission action, and while the signal F is not being output, the above receive action is executed. This send action and receive action are repeated in alternation upon each time T.

When the input pen 3 is held in a state of use in the effective area 12B (FIG. 1), an electric wave generated by the loop coil 251-*i* stimulates the coil 35 of the input pen 3, and an induced voltage G is generated in synchronization with the signal F in the resonance circuit 33.

Then, the action of the send/receive switching circuit 215 causes the detection circuit portion 20 to make a transfer to the receive action. Here, when the loop coil 251-*i* is switched to the side of the amplifier 228, the electric wave of the loop coil 251-*i* immediately disappears, and the induced voltage G in the resonance circuit 33 of the input pen 3 is gradually attenuated according to losses within the resonance circuit 33. Due to the current flowing in the resonance circuit 33 as a result of this induced voltage G, an electric wave is generated by the coil 35. The electric wave generated from the coil 35 excites the loop coil 251-*i* connected to the amplifier 228, and an induced voltage occurs in the loop coil 251-*i* due to the electric wave from the coil 35. This induced voltage is transmitted from the send/receive switching circuit 215 to the amplifier 228 only during the interval of the receive action, and is amplified to become a received signal H, which is sent to the reception timing switching circuit 218.

Information specifying either the X direction or the Y direction, and a reception timing signal D which is effectively the result of inverting the send/receive signal C, are input to the reception timing switching circuit 218. The reception timing switching circuit 218 outputs a receive signal H during the interval in which the signal D is at "High" level, and does not output anything while at "Low" level; hence a signal I which is effectively the same as the receive signal H is output to the band-pass filter 219.

The band-pass filter 219 is a filter (for example, a ceramic filter) with a characteristic frequency equal to the frequency f0. A signal J having an amplitude corresponding to the energy of the component of the signal I at frequency f0 is sent to the detector 220 and the phase-shift detectors 222, 223. More rigorously, in a state in which several signals I are input to the band-pass filter 219 and have converged, the band-pass filter 219 sends these signals J to the detector 220 and to the phase-shift detectors 222, 223.

Signals J input to the detector 220 are detected and rectified to become signals K, after which they are converted into DC signals L, having a voltage value Vxi corresponding to substantially ½ the amplitude, by a low-pass filter 221 with sufficiently low cutoff frequency, and these are sent to the control circuit 211.

The voltage value Vxi of a signal L is based on the induced voltage which is induced in a loop coil 251-*i*, and indicates a value which depends on the distance between the input pen 3 and the loop coil 251-*i*; here, the value is inversely proportional to substantially the fourth power of the distance. Consequently, when the loop coil 251-*i* is switched between different loop coils, the voltage values Vxi of the signals L in the loop coils will have different values.

Hence in the control circuit 211 the voltage values Vxi obtained for different loop coils are converted into digital values, and by executing prescribed computational processing, to compute the positional relationship between each of the loop coils and the input pen 3, the X-direction coordinate value of the position indicated by the input pen 3 can be obtained. The Y-direction coordinate value of the position indicated by the input pen 3 is similarly obtained. By this means, coordinates representing the position of the input pen 3 in the effective area 12B are obtained.

On the other hand, the square-wave signals A generated by the signal generation circuit 212 are input as detection signals to the phase-shift detector 222, and the square-wave signals B, lagging the phase of the square-wave signals A by 90°, are input as detection signals to the phase-shift detector 223. When the phase of a signal J substantially matches the phase of the square-wave signal A, the phase-shift detector 222 outputs a signal M1 having a waveform similar to that resulting from full-wave rectification of the signal J, while the phase-shift detector 223 outputs a signal M2 having a waveform which is symmetrical on the positive and negative sides. The signal M1 output from the phase-shift detector 222 is effectively the same as the signal K. The signal M1, similarly to the above signal K, is converted by the low-pass filter 224 into a DC signal N1 having a voltage value which corresponds to substantially ½ the amplitude of the signal J, that is, Vxi, and this signal is sent to the control circuit 211. Here, the DC signal N1 is effectively the same as the signal L. Further, the signal M2 is similarly converted by the low-pass filter 225 into a DC signal N2, which is sent to the control circuit 211.

The control circuit 211 converts the output values of the low-pass filters 224 and 225, here called the signals N1 and N2, into digital values, and uses the digital values thus obtained in prescribed computational processing to compute the phase difference θ between the signals applied to the phase-shift detectors 222 and 223, here called the signal J and the square-wave signal A.

Here the phase of the signal J corresponds to the resonance frequency of the resonance circuit 33 in the input pen 3. That is, when the resonance frequency of the resonance circuit 33 coincides with the prescribed frequency f0, an induced voltage at frequency f0 occurs in the resonance circuit 33 during both transmission actions and during reception actions, and, an induced current synchronous with this flows, so that the frequency and phase of the received signal H (or I) coincide with those of the square-wave signal A, and the phase of the signal J also coincides with that of the square-wave signal A.

On the other hand, when the resonance frequency of the resonance circuit 33 does not coincide with the prescribed frequency f0, if for example the frequency is slightly lower than the frequency f0 (f1<f0, and moreover f1 is nearly equal to f0), then an induced voltage at frequency f0 occurs in the resonance circuit 33 during the transmission action, and an induced current with a lagging phase flows in the resonance circuit 33 due to this induced voltage. Then, during the reception action an induced voltage substantially at frequency f1 occurs, and an induced current flows in synchronization with this, so that the frequency of the received signal H (or I) is slightly lower than the frequency of the square-wave signal A, and the phase also lags slightly. As explained above, the band-pass filter 219 has as its characteristic frequency only the frequency f0, and so the shift toward a lower frequency of the input signal is output as a phase shift, and therefore the phase of the signal J is delayed further from the received signal H (or I).

Conversely, if the resonance frequency of the resonance circuit 33 is slightly higher than the prescribed frequency f0, when for example the frequency is f2 (f2>f0, and f2 is nearly equal to f0), then during the transmission action an induced voltage at frequency f0 occurs in the resonance circuit 33, and an induced current flows in the resonance circuit 33 accompanying the advance in phase. During the reception action an induced voltage substantially at frequency f2 occurs and an induced current in synchronization with this flows, so that the frequency of the received signal H (or I) is slightly higher than the frequency of the square-wave signal A, and the phase leads somewhat. In the band-pass filter 219, this shift toward higher frequencies of the input signal is output as a phase advance, opposite to the case described above, and so the phase of the signal J further leads that of the received signal H (or I).

As explained above, the input pen 3 has a configuration in which the inductance of the coil 35 changes depending on the depressing force applied to the core 32. Hence when a depression operation is performed in which the core 32 is pressed against the housing panel 10A in the effective area 12B, this depression operation causes the inductance of the coil 35 to be increased, so that the resonance frequency of the resonance circuit 33 changes to, for example, a lower frequency. This change in the resonance frequency of the resonance circuit can be detected as a phase difference θ by the above-described control circuit 211 through computation processing. Hence the detection circuit portion 20 can detect the position of the input pen 3, and the magnitude of the depressing force at the time of a depression operation of the input pen 3. And, the detection circuit portion 20 generates operation signals indicating coordinates representing the position of the input pen (absolute position coordinates) in the effective area 12B and the depressing force applied to the core 32, and outputs these to the computer main board 18.

A notebook-sized computer 1 configured as described above comprises a keyboard 14, input pad 15 as a relative position coordinate system pointing device, and input switch 16, and further comprises a position detection portion 12. While performing input operations using the keyboard 14, the user can hold an input pen 3 in the hand and perform position input operations in the effective area 12B.

Operations using the input pen 3 are operations performed by holding the input pen 3 in the hand in the manner of a stylus, moving to an arbitrary position in the effective area 12B, and, as necessary, pressing the core 32 against the housing 10. Such operations are extremely similar to operations used to draw pictures and write characters using a stylus, and so can be performed by the user intuitively and without any sense of abnormality.

Further, because loop coils in the sensor substrate 25 can be formed from exceedingly thin wire, numerous loop coils can be placed in a limited area. Also, the core 32 is extremely small compared with the fingertips. Consequently the resolution when using the position detection portion 2 to perform position detection of the input pen 3 is extremely high compared with the resolution of an input pad 15 which utilizes, for example, changes in electrostatic capacitance. Hence simple operations can be used to perform position input with extremely high precision in the effective area 12B.

Further, the position detection portion 2 of the notebook-sized computer 1 utilizes the electromagnetic coupling with the resonance circuit 33 in the input pen 3 to detect the position of the input pen 3. Whereas many of the pointing devices in conventional notebook-sized computers (for example, input pads 15) detect position only when there is contact by a fingertip, the position detection portion 2 detects the position of the input pen 3 even when the core 32 is suspended above the surface, that is, when the core 32 is at a distance from the housing 10. Hence by using the position detection portion 2, there are the advantages that intuitive operation with a light touch is possible, and that the burden on the user's fingers is greatly reduced.

Further, whereas many of the pointing devices in conventional notebook-sized computers (for example, input pads 15) detect relative positions, the position detection portion 2 detects the absolute position of the input pen 3 in the effective area 12B. Hence intuitive operation with a lighter touch is possible.

In addition, the position detection portion 12 is also capable of detecting the level, for example in several hundred stages, of the pressing force applied to the core 32 of the input pen 3, and so enables simultaneous input of a pressing force together with position, which is not possible in the case of many pointing devices (for example, input pads 15) in notebook-sized computers of the prior art.

The detection circuit portion 20 and sensor substrate 25 comprised by the position detection portion 2 are incorporated within the lower main unit 12, and so there is no need to secure space for placement of a tablet as when, for example, connecting an external pen tablet to the notebook-sized computer 1, and so there is no detriment to the portability of the notebook-sized computer 1.

Moreover, the detection circuit portion 20 and sensor substrate 25 are incorporated within a general notebook-sized computer having space in the housing equivalent to a palm rest portion 12A, so that the notebook-sized computer 1 can easily be realized.

With respect to the operation of the notebook-sized computer 1 in response to position input operations using the input pen 3, by appropriately modifying application programs various settings can be made. For example, the CPU on the computer main board 18 can be made to execute an application program having handwriting and character recognition functions, and character recognition can be executed based on the paths traced by the input pen 3 and detected by the position detection portion 2, so that characters can be input using the input pen 3. In this case, even a user unfamiliar with operation of the keyboard 14 can easily perform character input operations. Also, the CPU can execute an application program having authentication functions based on a signature written by the user with the input pen 3; by comparing the path traced by and changes in the pressing force of the input pen 3, detected by the position detection portion 2 during operation, with data stored in advance, the authenticity of the signature can be judged. In this case, an authentication function can be realized which requires simple operation and affords excellent protection.

Of course by combining operations using the input pad 15 and input switch 16 with operations using the input pen 3, various other functions can be realized as well.

The configuration of the notebook-sized computer 1 in the above first aspect is merely one example, and of course the details of the configuration can be modified as appropriate. For example, the input switch 16 of the notebook-sized computer 1 can be placed on one side of the input pad 15; or, in place of the input pad 15, a stick-shape position input device can be provided between keys of the keyboard 14. In the above, the effective area 12B was explained has having nothing placed on the upper surface of the lower main unit 12; but this invention is not limited to such a configuration, and for example a sheet or similar may be placed in the area equivalent to the effective area 12B. This case is explained below as a second aspect.

Figure 4:
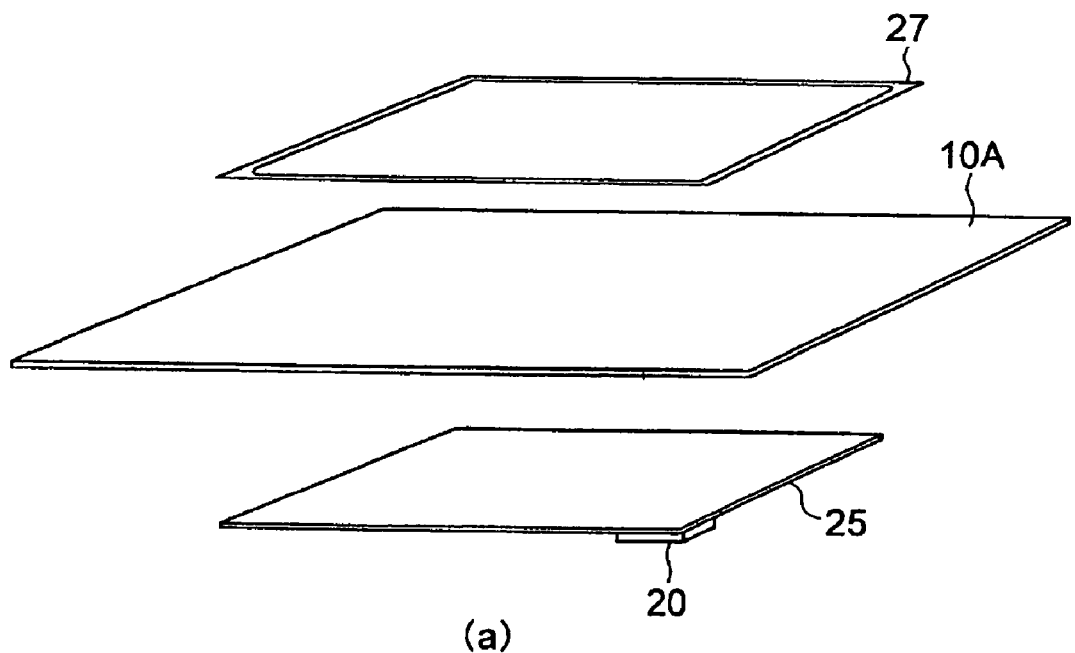
FIG. 4A is an exploded oblique view of the lower main unit according to a second embodiment and FIG. 4B is a cross-sectional view thereof.
Figure 4:
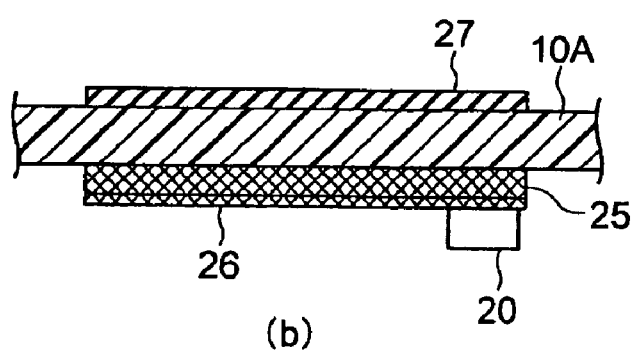

FIG. 4 shows the principal portions of the lower main unit 12 of the notebook-sized computer 1 of a second embodiment, in which FIG. 4A is an exploded oblique view and FIG. 4B is a cross-sectional view.

In this second embodiment, the various portions other than the surface sheet 27 described below are configured similarly to those of the notebook-sized computer 1 in the above-described first embodiment, and so the same symbols are used for these portions, and explanations are omitted.

As shown in FIG. 4(*a*), in the notebook-sized computer 1 of the second aspect, a surface sheet 27 is affixed at a position equivalent to the effective area 12B of the housing panel 10A.

The surface sheet 27 functions as an operation area display member, and is a sheet on which is drawn a substantially rectangular frame pattern or a substantially rectangular filled-in pattern, or similar, corresponding to the effective area 12B, which enables the user to visually confirm the position of the effective area 12B.

Because a sheet of a certain thickness would result in a step with the surface of the housing panel 10A and affect the sense of operation, it is preferable that the surface sheet 27 be as thin as possible.

Further, during use of the input pen 3 the surface sheet 27 and the core 32 make contact, or run against each other, and so the sense of operation of the input pen 3 changes depending on the surface state (or coefficient of friction) of the surface sheet 27. Hence by appropriately setting the surface state (or coefficient of friction) of the surface sheet 27, various senses of operation can be realized.

Moreover, by affixing the surface sheet 27 to the palm rest portion 12A, the position of the effective area 12B can be clearly displayed to the user of the notebook-sized computer 1. The position detection portion 2 detects the absolute position of the input pen 3 in the effective area 12B, and so, by enabling the user to visually confirm the position of the input pen 3 in the effective area 12B, a reference for operation is provided, with the advantage that convenience is further enhanced. In particular, when the input pen 3 is moved in an operation without causing the core 32 to make contact with the housing panel 10A, the surface sheet 27 is extremely useful as a reference for operation.

Methods other than that described above of affixing the surface sheet 27 are possible. For example, a synthetic resin application or similar, which can assume a prescribed surface state (or coefficient of friction), may be applied to the housing panel 10A, to form a film having the same functions as the surface sheet 27, thereby obtaining similar advantageous results. For example, when the housing panel 10A is a curved surface in the palm rest portion 12A, by adopting the method of applying such a synthetic resin application, a beautiful and uniform finish can be expected by means of a simple process.

Further, the configuration of the notebook-sized computer 1 in this second aspect is merely an example, and various appropriate modifications of the details of the configuration and similar are of course possible. For example, in the above first and second aspects, the sensor substrate 25 is positioned on the lower (rear) side of the housing panel 10A constituting the upper surface of the lower main unit 12; but a configuration may be employed in which a hole is provided in the housing panel 10A in the position equivalent to the effective area 12B. This case is described below as a third aspect.

Figure 5:
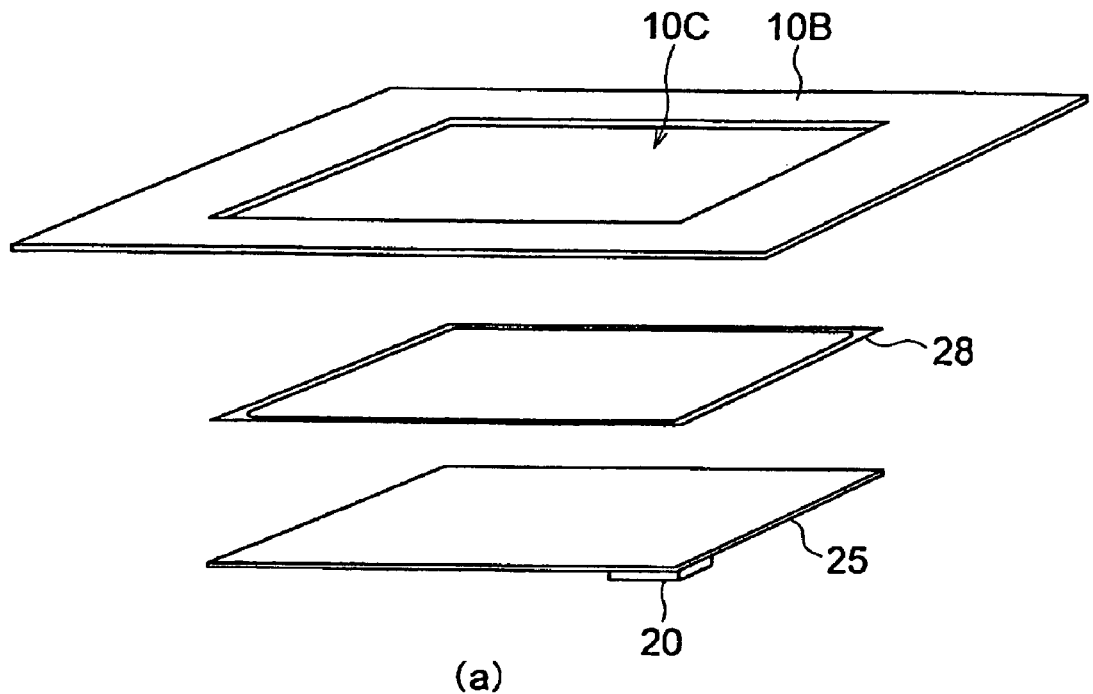
FIG. 5A is an exploded oblique view of the lower main unit according to a third embodiment and FIG. 5B is a cross-sectional view thereof; and, FIG. 6 is an external oblique view showing the configuration of a ring-type indicator according to a fourth embodiment.
Figure 5:
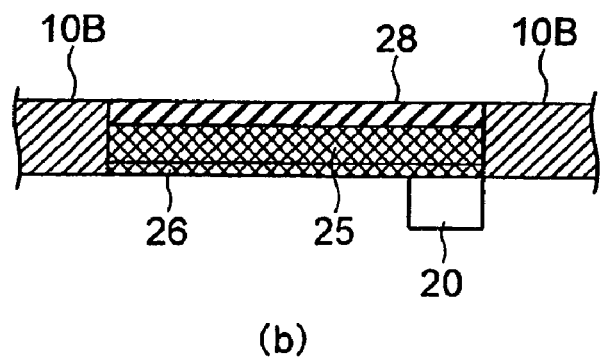

FIG. 5 shows the principal portions of the lower main unit 12 of the notebook-sized computer 1 of a third embodiment, in which FIG. 5A is an exploded oblique view and FIG. 5B is a cross-sectional view. In this third embodiment, the various portions other than the housing panel 10B and cover 28 described below are configured similarly to those of the notebook-sized computer 1 in the above-described first embodiment, and so the same symbols are used for these portions, and explanations are omitted.

The upper surface of the lower main unit 12 of the notebook-sized computer 1 of the third embodiment is constituted by the housing panel 10B. As shown in FIG. 5, a hole 10C is provided in the palm rest portion 12A of the housing panel 10B. The sensor substrate 25, positioned below the housing panel 10B, is exposed through this hole 10C.

That is, a depression is formed in the upper surface of the lower main unit 12, and the sensor substrate 25 forms the floor of this depression.

Here, the size and shape of the hole 10C are arbitrary, but it is preferable that the size and shape substantially match the area of the sensor substrate 25 in which are placed loop coils, that is, the effective area.

The surface of the sensor substrate 25 exposed through the hole 10C is covered by a cover 28. The cover 28 has the function of protecting the surface of the sensor substrate 25, and further has the function of producing a sense of operation using the input pen 3. During use of the input pen 3, the cover 28 and the core 32 make contact, or rub against each other, and so the sense of operation of the input pen 3 changes depending on the surface state (or coefficient of friction) of the cover 28. Hence by appropriately setting the surface state (or coefficient of friction) of the cover 28, various senses of operation can be realized.

Here, on the cover 28 may be drawn a substantially rectangular frame pattern or a substantially rectangular filled-in pattern, or similar, corresponding to the effective area, which enables the user to visually confirm the position of the effective area of the sensor substrate 25.

It is preferable that the cover 28 be formed from a material, such as a synthetic resin or the like, which does not impede the electromagnetic coupling between the input pen 3 and the sensor substrate 25. The cover 28 and the sensor substrate 25 are, for example, fixed in place with an adhesive.

A shield plate 26 is positioned on the rear-surface side of the sensor substrate 25, and the detection circuit portion 20 is connected to the loop coils placed in the sensor substrate 25.

By providing a hole 10C in the palm rest portion 12A, and exposing the cover 28 from the hole 10C, the depression formed on the inside of the hole 10C becomes the area in which operations by the input pen 3 are possible (the effective area). By means of this configuration, the area for operation of the input pen 3 can be clearly displayed to the user of the notebook-sized computer 1.

Further, by bringing the input pen 3 and the sensor substrate 25 into closer proximity, the detection precision by the position detection portion 2 can be enhanced.

Moreover, even when a material such as for example metal which impedes the electromagnetic coupling between the input pen 3 and the sensor substrate 25 is used in the housing panel 10B forming the housing of the notebook-sized computer 1, because the sensor substrate 25 is exposed through hole 10C, there is no effect on the detection operation by the position detection portion 2. Hence in the case of the configuration shown in FIG. 5, even when a magnesium alloy or other metal is used in the housing of the notebook-sized computer 1, there is the advantageous result that a position detection portion 2 can be installed as a pointing device affording an excellent sense of operation.

In the above third embodiment, in order to heighten the rigidity of the sensor substrate 25 exposed from the interior of the hole 10C, a reinforcing plate may be placed on the rear-surface side of the shield plate 26. As this reinforcing plate, a metal, synthetic resin, or other arbitrary material can be used.

The configuration of the notebook-sized computers 1 of the above first through third embodiments are merely examples, and of course appropriate modifications can be made to the detailed configuration. For example, in the above first through third embodiments, a finger ring-type position indicator can be used in place of an input pen 3. This case is explained below as a fourth embodiment.

Figure 6:
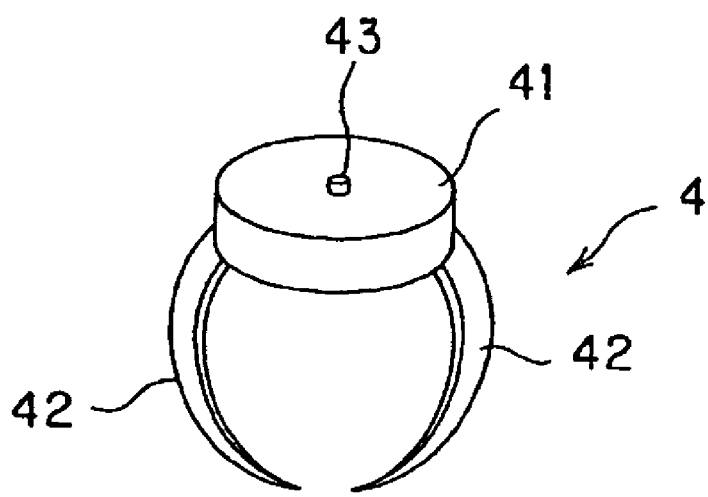

FIG. 6 is an external oblique view showing the configuration of the ring-type indicator 4 of a fourth embodiment to which this invention is applied.

The ring-type indicator 4 in FIG. 6 is a position indicator which replaces the input pen 3 in the notebook-sized computer 1 explained in the first through third embodiments.

As shown in FIG. 6, the ring-type indicator 4 comprises a circuit-accommodation portion 41 formed in substantially a planar shape, and two arm portions 42, protruding from the circuit-accommodation portion 41 and curved as support portions to form a ring. The arm portions 42 are of a material such as metal or a synthetic resin having elasticity. The gap between the two arm portions 42 can be widened by applying force.

A protrusion 43 protrudes from the tip surface of the arm portions 42 (the surface not on the side from which the arm portions 42 protrude), as a pressure operation portion.

The circuit-accommodation portion 41 incorporates the resonance circuit 33 of FIG. 3 of the above-described input pen 3, and comprises a mechanism such that, by applying a depressing force to the protrusion 43, the inductance of the coil 35 (FIG. 3) of the resonance circuit 33 is changed. Hence when a depressing force is applied to the protrusion 43, the resonance frequency of the resonance circuit 33 changes to, for example, a lower frequency.

This ring-type indicator 4 is worn on a finger of the user (for example, the thumb) with the protruding portion 43 directed downward. By moving the ring-type indicator 4 over the effective area 12B (or the cover 28), or by pressing the protrusion 43 downward, position input operations and pressure operations can be performed similarly to when using an input pen 3. The detection circuit portion 20 comprised by the notebook-sized computer 1 detects the position of the ring-type indicator on the effective area 12B (or cover 28), and in addition detects the magnitude of the depressing force applied to the protrusion 43 during pressure operation of the ring-type indicator 4.

When the ring-type indicator 4 is worn, the user's fingertip is exposed, and so the user can operate the keyboard 14 while wearing the ring-type indicator 4. Hence operation of the keyboard 14 and operation to input positions by means of the position indicator 2 can be performed in parallel, without the need to grasp an input pen 3, so that an exceedingly light touch in operation can be achieved.

By wearing the ring-type indicator 4 on a fingertip, position input operations in the position detection portion 2, as well as pressure operations in which the protrusion 43 is pressed against the housing panel 10A (or the cover 28), can be performed without taking an input pen 3 into one's hand.

The above-described embodiments are aspects of the invention, and of course various modifications and applications are possible within the scope of the invention.

It should be understood by those skilled in the art that various modifications, combinations, sub-combinations and alterations may occur, depending on design requirements and other factors, insofar as they are within the scope of the appended claims or equivalents thereof.

What is claimed is:

1. A notebook-sized computer, comprising a main unit having a display screen portion with a display screen and a key input portion, said notebook-sized computer further comprising an electrostatic capacitance type input pad by which the touch operation by user's finger is detectable, a palm rest portion arranged near the electrostatic capacitive type input pad underneath which a sensor substrate of a position detection device is placed, a surface sheet affixed to the palm rest portion above the location of the sensor substrate including a visual delineation of an effective area of operation for position detection, the surface sheet comprising a synthetic resin or similar material having a prescribed coefficient of friction, and the position detection device comprising the sensor substrate mounted internally in said notebook-sized computer and including a plurality of loop coils realized by one or a plurality of patterns on the sensor substrate, each of the loop coils comprising at least one turn, a position detection circuit electrically connected to the loop coils within the sensor substrate, a position indicator having a resonance circuit coupled to said coils in electromagnetic coupling fashion, wherein the detection circuit detects operations initiated by using the position indicator when the position indicator is placed in contact with or suspended a prescribed distance above the sensor substrate, and wherein using the position indicator in contact with the surface sheet produces a sense of operation due to friction.

2. The notebook-sized computer according to claim 1, wherein said position indicator comprises a pressure operation portion which is used in pressure operation, and a pressure-response mechanism in which the inductance of said coil changes according to the depressing force applied to the pressure operation portion, and wherein said position detection device detects pressure operation in said pressure operation portion by detecting the change in inductance of said coil of said position indicator.

3. The notebook-sized computer according to claim 1, wherein said sensor substrate, placed in a position corresponding to an operation area, numerous loop coils formed from exceedingly thin wire, and configured in a corresponding area on the sensor substrate.

4. The notebook-sized computer according to claim 3, wherein a shield plate of a magnetic material is placed on the rear-surface side of said sensor substrate.

5. The notebook-sized computer according to claim 3, wherein said sensor substrate is affixed to the rear side of the panel constituting the upper surface of said main unit.

6. The notebook-sized computer according to claim 3, wherein a depression is formed in the upper surface of said main unit in a range comprising said operation area, and said sensor substrate is placed at the bottom of said depression.

7. The notebook-sized computer according to claim 1, wherein a hole is provided in the palm rest portion, and said sensor substrate is substantially aligned with the hole, and the surface sheet is configured over the hole to provide a cover protecting the sensor substrate and further has the function of producing the sense of operation using the position indicator in contact with the surface sheet.

8. The notebook-sized computer according to claim 1, wherein an operation area display member which displays said operation area is provided on the upper surface of said main unit.

9. The notebook-sized computer according to claim 1, wherein a relative position input device which inputs relative position coordinates is positioned on the upper surface of said main unit, extending on the forward side of said key input portion, and said operation area is positioned on the side of said relative position input device.

10. An input system for a notebook-sized computer, comprising a main unit having a display screen portion with a display screen and a key input portion, an electrostatic capacitance type input pad by which the touch operation by user's finger is detectable, a palm rest portion arranged near the electrostatic capacitive type input pad underneath which a sensor substrate of a position detection device is placed, a surface sheet affixed to the palm rest portion above the location of the sensor substrate including a visual delineation of an effective area of operation for position detection, the surface sheet comprising a synthetic resin or similar material having a prescribed coefficient of friction producing a sense of operation using the position indicator in contact with the surface sheet, the position detection device comprising the sensor substrate mountable internally in said notebook-sized computer and including a plurality of loop coils realized by one or a plurality of patterns on the sensor substrate, each of the loop coils comprising at least one turn, a position detection circuit electrically connected to the loop coils within the sensor substrate, a hand held or worn position indicator having a resonance circuit coupled to said coils in electromagnetic coupling fashion, wherein the detection circuit detects operations initiated by using the position indicator when the position indicator is placed in contact with or suspended a prescribed distance above the sensor substrate.

11. The input system for a notebook-sized computer according to claim 10, wherein said position indicator comprises a pen-type housing incorporating said coil.

12. The input system for a notebook-sized computer according to claim 10, wherein said position indicator comprises a circuit accommodation portion which accommodates said coil, and a support portion which supports said circuit accommodation portion, and which has a shape of being held against a side face of a finger of the user, while maintaining a state of exposure of the fingertip of the finger of the user.

13. The input system for a notebook-sized computer according to claim 10, wherein said position indicator is a finger ring-type comprising a circuit-accommodation portion formed in substantially a planar shape, a protruding portion directed downward and sized for high precision position input and pressure operations, two arm portions protruding from the circuit-accommodation portion and curved as support portions to form a ring wearable on a user's finger while leaving the user's fingertip exposed.

14. The input system for a notebook-sized computer according to claim 10, wherein said position indicator is disposed adjacent an input pad.

15. The input system for a notebook-sized computer according to claim 10, wherein inductance of a coil of said position indicator varies as a function of pressure applied to the position indicator.

16. The input system for a notebook-sized computer according to claim 10, wherein said position indicator is remote from said display screen.

17. The input system for a notebook-sized computer according to claim 10, wherein said position indicator is overlaid by a protective sheet.

18. The input system for a notebook-sized computer according to claim 10, wherein a magnetic shield plate underlies said substrate.

19. The input system for a notebook-sized computer according to claim 10, wherein said position indicator is coupled to a plurality of loop coils.

20. The input system for a notebook-sized computer according to claim 19, wherein said loop coils are alternately actuated.

21. An input system for a notebook-sized computer, comprising a main unit having a display screen portion with a display screen and a key input portion, an electrostatic capacitance type input pad by which the touch operation by user's finger is detectable, a palm rest portion arranged near the electrostatic capacitive type input pad underneath which a sensor substrate of a position detection device is placed, the position detection device comprising the sensor substrate mountable internally in said notebook-sized computer and including a plurality of loop coils realized by one or a plurality of patterns on the sensor substrate, each of the loop coils comprising at least one turn, a position detection circuit electrically connected to the loop coils within the sensor substrate, a hand held or worn position indicator having a resonance circuit coupled to said coils in electromagnetic coupling fashion, wherein the detection circuit detects operations initiated by using the position indicator when the position indicator is placed in contact with or suspended a prescribed distance above the sensor substrate wherein said position indicator is a finger ring-type indicator comprising a circuit-accommodation portion formed in substantially a planar shape, a protruding portion directed downward and sized for high precision position input and pressure operations, two arm portions protruding from the circuit-accommodation portion and curved as support portions to form a ring wearable on a user's finger while leaving the user's fingertip exposed.

* * * * *